United States Patent
Hartsook

(10) Patent No.: US 9,109,832 B2
(45) Date of Patent: Aug. 18, 2015

(54) GRAIN BIN AERATION

(71) Applicant: Jeremy Hartsook, Eston (CA)

(72) Inventor: Jeremy Hartsook, Eston (CA)

( * ) Notice: Subject to any disclaimer, the term of this patent is extended or adjusted under 35 U.S.C. 154(b) by 0 days.

(21) Appl. No.: 13/902,440

(22) Filed: May 24, 2013

(65) Prior Publication Data

US 2013/0333234 A1  Dec. 19, 2013

(30) Foreign Application Priority Data

May 25, 2012  (CA) ..................... 2776964

(51) Int. Cl.
| | | |
|---|---|---|
| *F26B 5/00* | (2006.01) | |
| *F26B 19/00* | (2006.01) | |
| *A23B 9/08* | (2006.01) | |
| *B23P 19/00* | (2006.01) | |
| *F26B 9/10* | (2006.01) | |

(52) U.S. Cl.
CPC . *F26B 19/00* (2013.01); *A23B 9/08* (2013.01); *B23P 19/00* (2013.01); *F26B 9/103* (2013.01); *Y10T 29/49826* (2015.01)

(58) Field of Classification Search
CPC .............. F26B 3/00; F26B 5/00; F26B 19/00; A23B 9/00; A23B 9/03; B23P 19/00
USPC ........... 34/170, 174, 210, 218, 232; 15/340.1, 15/352; 223/70
See application file for complete search history.

(56) References Cited

U.S. PATENT DOCUMENTS

| | | | | |
|---|---|---|---|---|
| 3,110,578 | A * | 11/1963 | Severson et al. ................ | 48/203 |
| 5,592,750 | A * | 1/1997 | Eichten .......................... | 34/104 |
| 5,862,606 | A * | 1/1999 | Jannach ......................... | 34/106 |
| 7,430,816 | B1 * | 10/2008 | Lozenski ........................ | 34/104 |
| 7,568,297 | B2 * | 8/2009 | Pierson et al. .................. | 34/218 |
| 8,132,337 | B1 * | 3/2012 | Batey ............................. | 34/104 |
| 8,468,716 | B1 * | 6/2013 | Walker et al. .................. | 34/435 |
| 8,793,891 | B2 * | 8/2014 | Varro ............................. | 34/60 |
| 2007/0234587 | A1 * | 10/2007 | Pierson et al. .................. | 34/168 |
| 2011/0219638 | A1 * | 9/2011 | Schreiner ....................... | 34/218 |
| 2013/0333234 | A1 * | 12/2013 | Hartsook ....................... | 34/232 |
| 2014/0075776 | A1 * | 3/2014 | Potter et al. .................... | 34/493 |
| 2015/0026992 | A1 * | 1/2015 | Kim et al. ....................... | 34/86 |

* cited by examiner

*Primary Examiner* — Stephen M Gravini
(74) *Attorney, Agent, or Firm* — Dicke, Billig & Czaja, PLLC

(57) ABSTRACT

An aeration duct apparatus has a plurality of aeration tubes connected together by hollow connectors, each hollow connector defining at least three connection ports. Each aeration tube is connected at each tube end thereof to one of the connection ports, and each connection port is connected to a tube end such that the connected aeration tubes and hollow connectors form a substantially rigid structure. A transition duct is connected to one of the aeration tubes at an inside end thereof and is adapted at an outside end thereof for attachment to a fan. The aeration tubes and transition duct are configured such that air can flow from the fan through the transition duct into each aeration tube and out through a perforated area of walls of the aeration tubes.

23 Claims, 3 Drawing Sheets

GRAIN BIN AERATION

FIELD

This invention is in the field of grain storage and aeration bins and in particular an aeration duct apparatus that is well suited for hopper bottom grain bins with floors sloping to a discharge opening.

BACKGROUND

Aeration systems are used to prevent spoilage in stored grain, and to reduce the moisture content of the grain. Such systems include a perforated duct located inside the bin, and a fan directing air into the duct, out through the perforations and up through the grain and out through a vent in the roof of the bin. The fan and perforated duct area are sized to provide the desired airflow for the height and volume of grain in the bin. The perforated duct area must be large enough to provide sufficient open spaces so that the required volume of air can flow through the perforations without developing excessive back-pressure.

Providing sufficient perforated area in flat bottom bins is not usually a problem as the duct can be provided by a perforated floor area, or by a horizontal perforated tube or tube network if more perforated area is required resting on the bin. Such systems are also readily placed in flat bottom bins which have access doors at ground level to allow personnel to enter to manually empty the bin.

Hopper bottom bins have a cone shaped floor sloping to a central discharge chute so that all the grain flows down the floor to the chute, and no manual removal is required as in a flat floor bin.

Since the floor of a hopper bottom bin slopes, the length of a horizontal tube network in the hopper is limited. To provide added perforated wall area, vertical tubes with concentric perforated inner and outer walls are commonly used, such as the "Rocket™" vertical aeration systems sold by Edwards Grain Guard of Lethbridge, Alberta, Canada. A transition duct extends through the sloped floor to connect the fan outside the bin to the tube which extends upward in the center of the bin, and air flows out the perforated sides and out the open bottom and upward through the grain in the bin. Grain flows downward along the outer walls and also down through the open center of the tube along the inner walls.

U.S. Pat. No. 7,568,297 to Pierson et al. discloses an aeration duct for a hopper bottom bin that has a pyramid frame in the center of the bin with legs attachable to the sloped floor of the hopper bottom, and sloping concave perforated walls attached to the legs. An air stream is directed into the interior of the frame, and moves out into the grain through the perforated walls.

Canadian Patent Application Number 2,707,941 of Assie discloses an aeration duct for a hopper bottom bin that comprises an enclosed box with an open bottom and louvered top that extends across the cone at the bottom of the bin. Air is directed into the enclosure and then out the open bottom and the louvers along the length of the box and up through the grain.

A problem with hopper bin aeration duct systems is the difficulty of installing them in existing bins. Such hopper bins typically have the discharge opening at the bottom, and a only a relatively small access opening in the sloping floor or the wall above the floor. For example the conventional Rocket™ system must be installed before the bin is installed on the hopper. To address this limitation the manufacturer has developed a Retro Rocket™ where the pieces can fit through the available access holes and be assembled inside the bin. Pierson also claims to be able to install his system in existing bins.

SUMMARY OF THE INVENTION

It is an object of the present invention to provide an aeration duct apparatus that overcomes problems in the prior art.

In a first embodiment the present invention provides an aeration duct apparatus comprising a plurality of aeration tubes and a plurality of hollow connectors, each hollow connector defining at least three connection ports. Each aeration tube is connected at each tube end thereof to one of the connection ports, and each connection port is connected to a tube end such that the connected aeration tubes and hollow connectors form a substantially rigid structure. A transition duct is connected to one of the aeration tubes at an inside end thereof and is adapted at an outside end thereof for attachment to a fan. The aeration tubes and transition duct are configured such that air can flow from the fan through the transition duct into each aeration tube and out through a perforated area of walls of the aeration tubes.

In a second embodiment the present invention provides a method of installing an aeration duct apparatus in a hopper bottom grain bin, the bin having a sloping floor, a bottom discharge opening, and an access port in the sloping floor. The method comprises inserting a plurality of aeration tubes and a plurality of hollow connectors into the bin through the access port or through the discharge opening, each hollow connector defining at least three connection ports;

connecting each tube end of each aeration tube to one of the connection ports such that a tube end is connected to each connection port and such that the connected aeration tubes and hollow connectors form a substantially rigid structure; passing a transition duct through an aperture in the sloping floor and connecting an inside end of the transition duct to one of the aeration tubes, the transition duct adapted at an outside end thereof for attachment to a fan. The aeration tubes and transition duct are configured such that air can flow from the fan through the transition duct into each aeration tube and out through a perforated area of walls of the aeration tubes.

The aeration duct apparatus comprises small parts that can be easily placed inside an existing grain bin, such as in particular through the typical small openings in a hopper bottom bin, and assembled inside the bin. The area of perforated wall area can be readily increased or decreased as required by adding or removing layers of horizontal aeration tubes to suit the size of bin and desired air volume flow rate.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
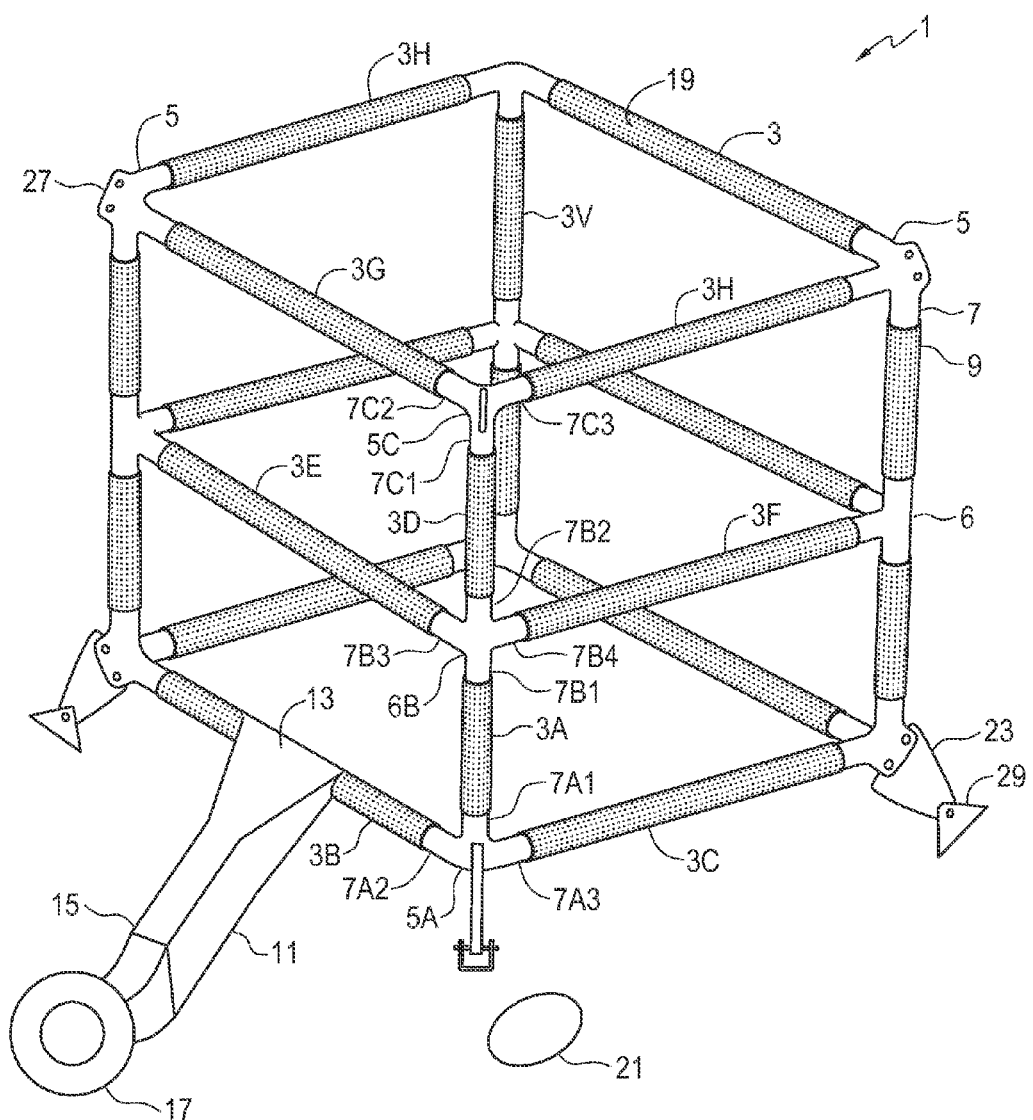
FIG. 1 is a schematic perspective view of an embodiment of an aeration duct apparatus of the present invention.
Figure 2:
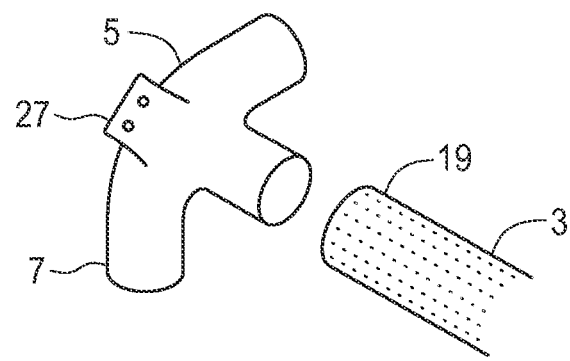
FIG. 2 is a schematic perspective view of a corner hollow connector as used in the embodiment of FIG. 1.
Figure 3:
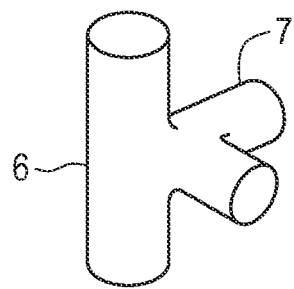
FIG. 3 is a schematic perspective view of a middle hollow connector as used in the embodiment of FIG. 1.

FIG. 1 schematically illustrates an embodiment of an aeration duct apparatus 1 of the present invention. The illustrated apparatus 1 comprises a plurality of aeration tubes 3, and a plurality of corner hollow connectors 5 and middle hollow connectors 6. Each corner hollow connector 5 defines three connection ports 7, and each middle hollow connector 6 defines four connection ports 7 as schematically illustrated in FIGS. 2 and 3. Each aeration tube 3 is connected at each tube end 9 thereof to one of the connection ports 7, and each connection port 7 is connected to a tube end 9 such that the connected aeration tubes 3 and hollow connectors 5, 6 form a substantially rigid structure as illustrated.

A transition duct 11 is connected to one of the aeration tubes 3 at an inside end 13 thereof and is adapted at an outside end 15 thereof for attachment to a fan 17. As can be readily seen in the illustrated structure, the aeration tubes 3 and transition duct 11 are configured such that air can flow from the fan through the transition duct 11 into each aeration tube 3 via the hollow connectors 5, 6 and out through a perforated area 19 of walls of the aeration tubes 3.

The apparatus 1 is installed substantially centered on the sloping floor of a hopper bottom bin with discharge opening 21 under the middle of the apparatus 1. The open structure of the apparatus 1 allows grain to flow freely to the discharge opening 21.

Figure 5A:
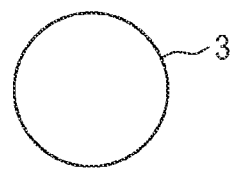
FIGS. 5A-5C show schematic end views of examples of different possible aeration tube shapes.
Figure 5B:
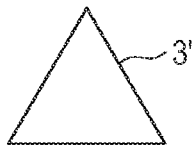
Figure 5C:
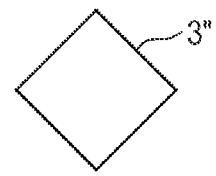

The illustrated aeration tubes 3 are cylindrical and it is contemplated that the cylindrical shape will be the most economical to make and will function satisfactorily, as such cylindrical aeration tubes are well known in the prior art. Figs. 5A-5C schematically illustrate the circular cross-section of the illustrated cylindrical aeration tubes 3 (FIG.5A), and also shows aeration tubes 3' with a possible triangular cross-section FIG. 5B) and 3" with a possible square cross-section FIG. 5C) The corners of the triangular and square tubes 3', 3" are oriented upward so grain will flow down the sides of the tubes to the discharge opening 21.

In the illustrated apparatus 1 a first vertical aeration tube 3A is connected at a lower tube end thereof to a first connection port 7A1 of a lower corner hollow connector 5A, and first and second horizontal lower aeration tubes 3B, 3C are connected to second and third connection ports 7A2, 7A3 of the lower corner hollow connector 5A.

The first vertical aeration tube 3A is connected at an upper tube end thereof to a first connection port 7B1 of a middle hollow connector 6B, and a second vertical aeration tube 3D is connected at a lower tube end thereof to a second connection port 7B2 of the middle hollow connector 6B such that the first and second vertical aeration tubes 3A, 3D are substantially aligned. First and second horizontal middle aeration tubes 3E, 3F are connected to third and fourth connection ports 7B3, 7B4 of the middle hollow connector 6B.

The second vertical aeration tube 3D is connected at an upper tube end thereof to a first connection port 7C1 of an upper corner hollow connector 5C, and first and second horizontal upper aeration tubes 3G, 3H are connected to second and third connection ports 7C2, 7C3 of the upper corner hollow connector 5C.

The upper, middle and lower horizontal tubes 3B, 3C, 3E, 3F, 3G, 3H are connected at there opposite ends to further corresponding upper, middle, and lower corner and middle hollow connectors 5, 6 and further aeration tubes 3 are connected as illustrated to form the substantially rigid, free standing structure.

The connection ports 7 are provided by tube joiners extending from the hollow connectors 5, 6. The tube joiners are configured to slide into the tube ends 9 of the aeration tubes 3. The tube joiners could also be configured to slide over the tube ends 9 of the aeration tubes. Screws, rivets or the like can be used to fasten the hollow connectors 5, 6 and the aeration tubes 3 together to resist the force of grain entering and leaving the bin.

Thus it can be seen that the illustrated apparatus 1 thus provides an open rectangular network of aeration tubes 3 that will not block the flow of grain from the bin to the discharge opening 21. The illustrated apparatus 1 provides three layers of horizontal aeration tubes. In the alternate apparatus 1' shown in FIG. 8, the middle hollow connectors 6 are not used and the vertical aeration tubes 3 are attached at upper and lower ends to corner hollow connectors 5, such that the apparatus 1' has only two layers.

Each layer provides added perforated wall area 19 to the apparatus 1. It is generally desired to provide a certain air volume flow rate, such as for example 1 cubic foot per minute, for each bushel of grain in the bin. To reduce back pressure on the fan, the perforated wall area 19 needed for a given bin is selected to correspond to the number of bushels in the bin and allow for the flow rate Larger bins holding more bushels of grain therefore require a larger air volume flow rate and a larger perforated wall area. In the present invention it is a simple matter to provide more or less layers of horizontal aeration tubes to provide the required perforated wall area. It can be seen that another layer could be added to the three layers of the apparatus 1 by simply replacing the upper corner hollow connectors 5 with middle hollow connectors 6 and adding vertical aeration tubes 3 to make the structure higher.

Figure 8:
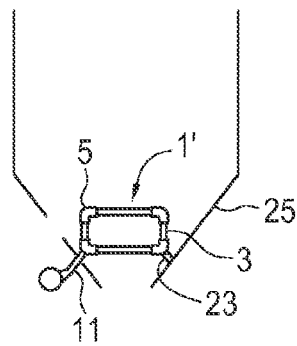
FIG. 8 is a schematic sectional side view showing how the parts placed in the bin as in FIG. 7 are assembled inside the bin.

Legs 23 extend downward from the structure and are adapted at lower ends thereof for attachment to a sloping bin floor 25, as schematically illustrated in FIG. 8. In the illustrated apparatus 1, the legs 23 are conveniently provided by forming a leg bracket 27 extending outward from each corner bracket 5. The leg brackets 27 are adapted for attachment to a leg 23 by bolts or the like, and a pivotally attached foot plate 29 on the bottom of the leg 23 can be fixed to the sloping bin floor 25, regardless of the slope of the floor.

The leg bracket 27 is formed on each corner hollow connector 5, regardless of whether the corner hollow connector 5 will be a lower corner hollow connector, and thus attached to the floor and require the leg bracket 27, or an upper corner hollow connector, and so not attached to the floor. The corner hollow connectors 5 will typically be molded from plastic such that the added cost of providing the leg bracket 27 on each is minimal. The result is the apparatus 1 requires only two different hollow connectors 5, 6 simplifying manufacture, transport, inventory, and the like.

Similarly the horizontal aeration tubes 3H are all the same length, while the vertical aeration tubes 3V are also all the same length but about half the length of the horizontal aeration tubes 3H. Thus the layers of horizontal aeration tubes 3H are separated by a lesser distance, which can be selected by selecting the length of the vertical aeration tubes 3V. The result is the apparatus 1 also requires only two different lengths of aeration tubes 3, again simplifying manufacture, transport, inventory, and the like.

Figure 6A:
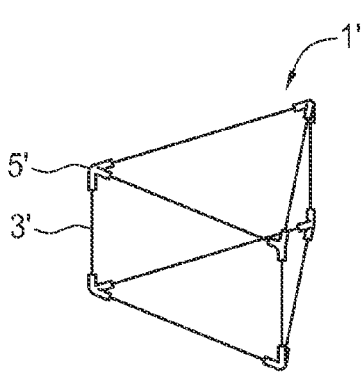
FIGS. 6A-6B show schematic perspective views of examples of different possible shapes of the structure of the assembled aeration duct apparatus of the present invention.
Figure 6B:
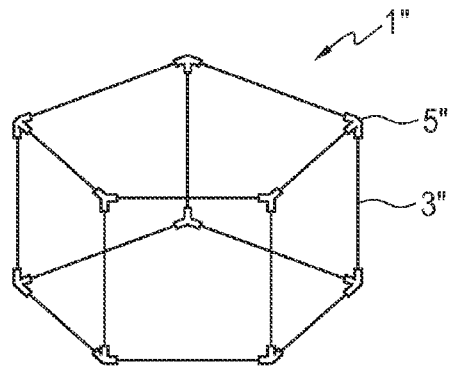

The illustrated apparatus 1 is a square configuration however Figs. 6A-6B schematically illustrate alternate configurations where for example the apparatus 1' has the hollow connectors 5' configured so the aeration tubes 3' form a triangular structure (FIG. 6A) and the apparatus 1" has the hollow connectors 5" configured so the aeration tubes 3" form a pentagonal structure (FIG. 6B). It is contemplated as well that the aeration tubes 3 could be oriented at some angle to the vertical and horizontal, however the illustrated vertical and horizontal aeration tubes 3 provide a simple and effective structure.

Figure 4:
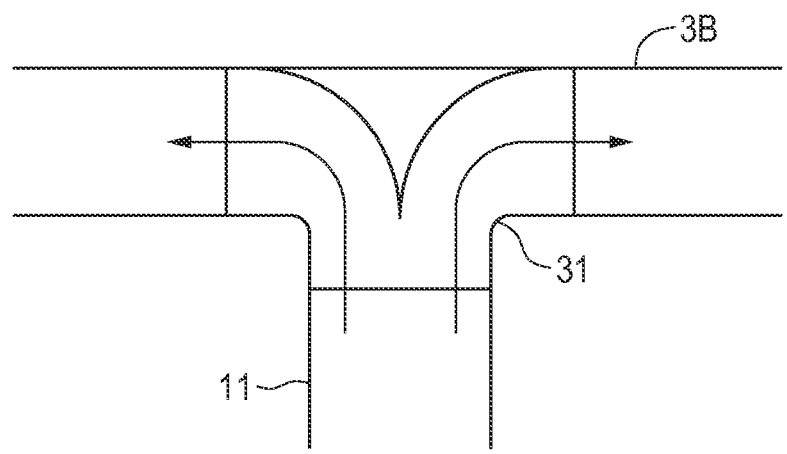
FIG. 4 is a schematic cut away top view of a Y-connector for connecting the transition duct to an aeration tube.

To complete the apparatus 1, the transition duct 11 is connected to one of the horizontal lower aeration tubes, which in the illustrated apparatus 1 is aeration tube 3B. In a typical apparatus 1, the aeration tube 3B that is connected to the transition duct 11 will be configured for that purpose. It will have the same length and cross-section as the other aeration tubes 3, but will also have a precut opening where the inside end 13 of the transition duct can be easily connected. It is contemplated as well that to improve air flow the connected aeration tube 3b will include a Y-connector 31, as schematically illustrated in FIG. 4, and the transition duct 11 will be connected to the lower aeration tube 3B at the Y-connector which is configured to direct air from the transition duct 11 substantially equally toward each opposite tube end of the lower aeration tube 3B.

Figure 7:
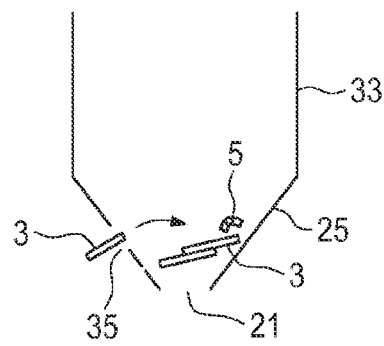
FIG. 7 is a schematic sectional side view showing how the parts of the embodiment of FIG. 1 can be placed into an existing hopper bottom grain bin.

The aeration duct apparatus of the present invention comprises a plurality of relatively small pieces that are readily assembled and can be installed, as schematically illustrated in FIGS. 7 and 8, in an existing hopper bottom grain bin 33 with a sloping floor 25, a bottom discharge opening 21, and an access port 35 in the sloping floor 25.

The apparatus 1' is installed in the hopper bottom grain bin 33 by inserting the required plurality of aeration tubes 3, and hollow connectors 5 into the bin through the access port 35 or the or through the discharge opening 21, or both as may be convenient. It is contemplated that the aeration tubes 3 will typically have a diameter of between six and ten inches, and thus easily placed in the bin 33.

The area of perforated wall area can be readily increased or decreased, using the same few different parts, by adding or removing layers of horizontal aeration tubes to suit the size of bin and desired air volume flow rate.

The tube end of each aeration tube 3 is connected to one of the connection ports 7 of the hollow connectors 5 as described above to form a substantially rigid structure. The transition duct 11 is passed through an aperture that typically will need to be cut through the sloping floor 25 and connected at the inside end thereof to one of the aeration tubes 3.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. An aeration duct apparatus comprising:
a plurality of aeration tubes;
a plurality of hollow connectors, each hollow connector defining at least three connection ports;
wherein each aeration tube is connected at each tube end thereof to one of the connection ports;
and wherein each connection port is connected to a tube end such that each tube end is connected by one of the connectors to at least two other tube ends such that the connected aeration tubes and hollow connectors form a substantially rigid structure;
a transition duct connected to one of the aeration tubes at an inside end thereof and adapted at an outside end thereof for attachment to a fan;
wherein the aeration tubes and transition duct are configured such that air can flow from the fan through the transition duct into each aeration tube and through each aeration tube into an adjacent aeration tube and out through a perforated area of walls of the aeration tubes.

2. The apparatus of claim 1 comprising:
a first vertical aeration tube connected at a lower tube end thereof to a first connection port of a lower corner hollow connector;
first and second horizontal lower aeration tubes connected to second and third connection ports of the lower corner hollow connector.

3. The apparatus of claim 2 wherein the first vertical aeration tube is connected at an upper tube end thereof to a first connection port of an upper corner hollow connector, and comprising first and second horizontal upper aeration tubes connected to second and third connection ports of the upper corner hollow connector.

4. The apparatus of claim 2 wherein the first vertical aeration tube is connected at an upper tube end thereof to a first connection port of a middle hollow connector, and a second vertical aeration tube is connected at a lower tube end thereof to a second connection port of the middle hollow connector, and comprising first and second horizontal middle aeration tubes connected to third and fourth connection ports of the middle hollow connector.

5. The apparatus of claim 4 wherein the second vertical aeration tube is connected at an upper tube end thereof to a first connection port of an upper corner hollow connector, and comprising first and second horizontal upper aeration tubes connected to second and third connection ports of the upper corner hollow connector.

6. The apparatus of claim 4 wherein the first and second vertical aeration tubes have a length that is less than a length of the horizontal aeration tubes.

7. The apparatus of claim 4 wherein the first and second vertical aeration tubes are substantially aligned.

8. The apparatus of claim 3 wherein the transition duct is connected to one of the first and second horizontal lower aeration tubes.

9. The apparatus of claim 7 wherein the transition duct is connected to the lower aeration tube by a Y-connector configured to direct air from the transition duct substantially equally toward each opposite tube end of the lower aeration tube.

10. The apparatus of claim 3 wherein the structure comprises a plurality of corner hollow connectors and wherein each corner hollow connector comprises a leg bracket extending outward therefrom, the leg bracket adapted for attachment to a leg.

11. The apparatus of claim 9 wherein the structure comprises a plurality of lower corner hollow connectors and comprising a leg attached to the leg bracket on each lower corner hollow connector, each leg adapted at a lower end thereof for attachment to a sloping bin floor.

12. The apparatus of claim 1 comprising legs extending downward from the structure and adapted at lower ends thereof for attachment to a sloping bin floor.

13. The apparatus of claim 1 wherein the connection ports are provided by tube joiners extending from the hollow connectors, the tube joiners configured to slide either into the tube ends of the aeration tubes or over the tube ends of the aeration tubes.

14. A method of installing an aeration duct apparatus in a hopper bottom grain bin, the bin having a sloping floor, a bottom discharge opening, and an access port in the sloping floor, the method comprising:
 inserting a plurality of aeration tubes and a plurality of hollow connectors into the bin through the access port or through the discharge opening, each hollow connector defining at least three connection ports;
 connecting each tube end of each aeration tube to one of the connection ports such that a tube end is connected to each connection port and such that each tube end is connected by one of the connectors to at least two other tube ends such that the connected aeration tubes and hollow connectors form a substantially rigid structure;
 passing a transition duct through an aperture in the sloping floor and connecting an inside end of the transition duct to one of the aeration tubes, the transition duct adapted at an outside end thereof for attachment to a fan;
 wherein the aeration tubes and transition duct are configured such that air can flow from the fan through the transition duct into each aeration tube and through each aeration tube into an adjacent aeration tube and out through a perforated area of walls of the aeration tubes.

15. The method of claim 13 comprising connecting a lower tube end of a first vertical aeration tube to a first connection port of a lower corner hollow connector, and connecting first and second horizontal lower aeration tubes to second and third connection ports of the lower corner hollow connector.

16. The method of claim 14 comprising connecting an upper tube end of the first vertical aeration tube to a first connection port of an upper corner hollow connector, and connecting first and second horizontal upper aeration tubes to second and third connection ports of the upper corner hollow connector.

17. The method of claim 14 comprising connecting an upper tube end of the first vertical aeration tube to a first connection port of a middle hollow connector, and connecting a lower tube end of a second vertical aeration tube at to a second connection port of the middle hollow connector, and connecting first and second horizontal middle aeration tubes to third and fourth connection ports of the middle hollow connector.

18. The method of claim 16 comprising connecting an upper tube end of the second vertical aeration tube to a first connection port of an upper corner hollow connector, and connecting first and second horizontal upper aeration tubes to second and third connection ports of the upper corner hollow connector.

19. The method of claim 14 comprising connecting the inside end of the transition duct to one of the first and second horizontal lower aeration tubes.

20. The method of claim 18 comprising connecting the transition to the lower aeration tube by a Y-connector and directing air from the transition duct substantially equally toward each opposite tube end of the lower aeration tube.

21. The method of claim 14 wherein the structure comprises a plurality of lower corner hollow connectors and comprising providing a leg bracket extending outward from each lower corner hollow connector, attaching a leg to the leg bracket on each lower corner hollow connector, and attaching a lower end of each leg to the sloping bin floor.

22. The method of claim 20 wherein the structure comprises a plurality of upper corner hollow connectors, and providing a leg bracket extending outward from each upper corner hollow connector, the leg bracket adapted for attachment to a leg.

23. The method of claim 14 wherein the connection ports are provided by tube joiners extending from the hollow connectors, and comprising connecting the tube ends of the aeration tubes to the connection ports by sliding the tube joiners into the tube ends or by sliding the tube joiners over the tube ends of the aeration tubes.

* * * * *